Aug. 4, 1953     R. A. WALLAUSCHEK     2,648,046
PIEZOELECTRIC MAGNETOMETER

Filed Sept. 14, 1950                                   3 Sheets-Sheet 1

INVENTOR
RICHARD A. WALLAUSCHEK
BY
Pennie, Edmonds, Morton & Barrows
ATTORNEYS

Aug. 4, 1953  R. A. WALLAUSCHEK  2,648,046
PIEZOELECTRIC MAGNETOMETER
Filed Sept. 14, 1950  3 Sheets-Sheet 2

INVENTOR
RICHARD A. WALLAUSCHEK
BY
ATTORNEYS

Aug. 4, 1953  R. A. WALLAUSCHEK  2,648,046
PIEZOELECTRIC MAGNETOMETER
Filed Sept. 14, 1950  3 Sheets-Sheet 3
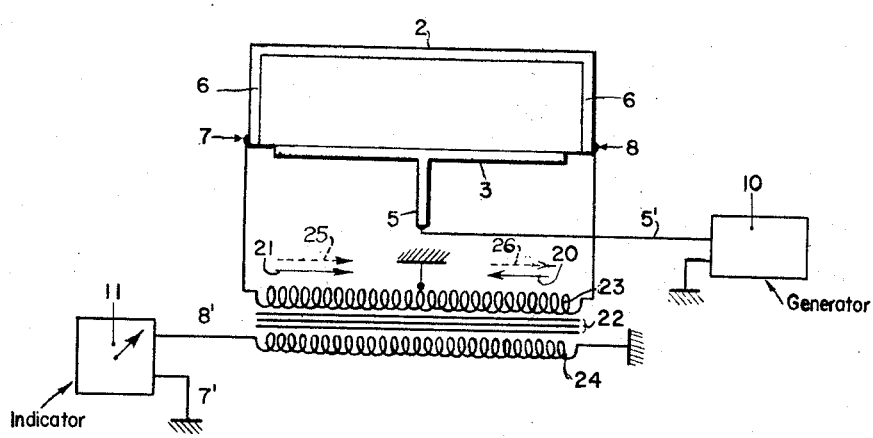
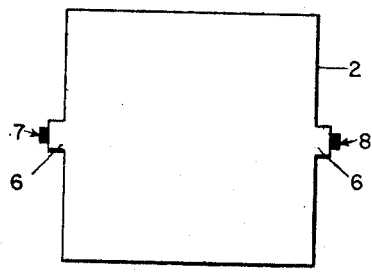
Fig. 7
INVENTOR
RICHARD A. WALLAUSCHEK
BY
Pennie, Edmonds, Morton & Barrows
ATTORNEYS Patented Aug. 4, 1953

2,648,046

UNITED STATES PATENT OFFICE 2,648,046

PIEZOELECTRIC MAGNETOMETER

Richard A. Wallauschek, L'Etang-la-Ville, France

Application September 14, 1950, Serial No. 184,748
In France September 27, 1949

5 Claims. (Cl. 324—43)

The present invention relates to piezo-electric magnetometers.

Magnetometers are known in which a loop of wire of given area, as for example a rectangular loop, is vibrated by piezo-electric means at a given frequency $f$ through a small angle $\pm v_0$ about the horizontal.

If $\delta$ denotes the angle between the field H to be measured and the vertical, $\theta$ the angle between the horizontal component of the field and the axis about which the loop is vibrated, and S the area of the loop, and if it is assumed that the angle of vibration $v$ varies according to a sinusoidal law of the form $$v = v_0 \sin 2\pi\, ft.$$

then the flux $\Phi$ of the field through the loop will be given by the equation:

$$\Phi = S \cdot H\, [\sin \delta \sin \theta \sin (v_0 \sin 2\pi\, ft) + \cos \delta \cos(v_0 \sin 2\pi\, ft)]$$

This expression is not a sinusoidal function of time, since its development would contain Bessel functions. Therefore such prior art magnetometers are used as zero indicating meters for recording the direction of the horizontal component of the terrestrial field, but not for its measurement.

An object of the invention is to provide an improved piezo-electric magnetometer comprising a very handy probe of a tiny size adapted to measure the magnetic fields present in constricted spaces which are difficult of access, such as the inside volume of the helix of a traveling wave tube. Another object of the invention is the measurement of alternating magnetic fields of low and moderate frequencies (up to a few kc./s.).

Another object of the invention is the measurement of very unhomogeneous magnetic fields.

Other objects and advantages will appear during the course of the description.

According to one feature of the invention the loop is formed by depositing a metallic layer on the side walls of a piezo-electric crystal. The crystal is then excited by means of piezo-electric vibrations in the plane of the loop, so that the loop exhibits a periodically varying area while remaining in substantially the same fixed plane. The crystal bearing the loop so formed constitutes the exploration probe of the magnetometer of which it is a part.

The invention will now be further described in conjunction with the accompanying drawings in which:

Fig. 6 is a view in side elevation of a modified form of exploration probe together with a diagrammatic representation of the other components of a magnetometer suitable for use therewith;

Fig. 7 is a plan view of the probe of Fig. 6; and

Figure 2:
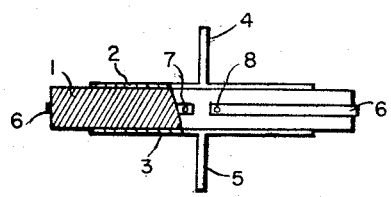
Fig. 2 is a side elevation, partly broken away, along the section line 2—2 of Fig. 3 of the exploration probe of a magnetometer according to the invention.
Figure 3:
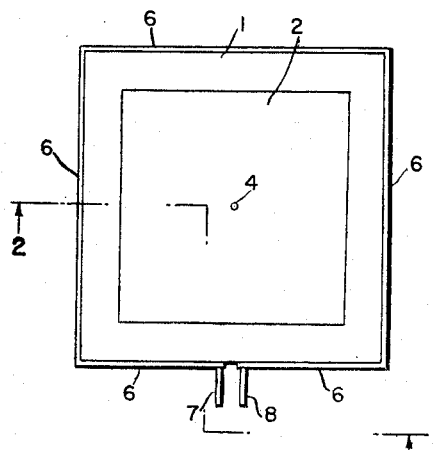
Fig. 3 is a plan view of the probe of Fig. 2.

In the embodiments of Figs. 2-5, the probe for exploration of the magnetic fields to be measured is represented diagrammatically in Figs. 2 and 3. A piezo-electric crystal 1 having the shape of a square prismatic plate is provided on opposite faces with metallic electrodes 2 and 3 formed, for example, by a direct deposit of metal sprayed onto the crystal surface. The electrical terminals 4 and 5 which are soldered or otherwise fastened to the electrodes 2 and 3 may serve at the same time as mechanical supports for the crystal. A metal band 6 applied to the lateral surface of the crystal as by spraying surrounds the periphery of the crystal like a nearly closed loop. Two terminal connections 7 and 8 are soldered to the two ends of the band 6, which are separated by a narrow gap.

Figure 4:
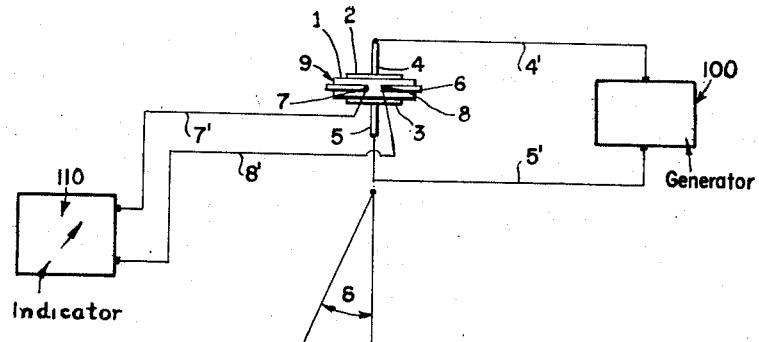
Fig. 4 is a diagrammatic representation of a magnetometer according to the invention.

The exploration probe described above is incorporated in the magnetometer represented diagrammatically in Fig. 4. In Fig. 4 the excitation terminals 4 and 5 of the probe, generally indicated at 9, are connected by leads 4' and 5' to an A. C. generator generally indicated at 10, while leads 7' and 8' connect the loop terminals 7 and 8 of the probe to an A. C. voltage indicator generally indicated at 11. The probe 9 is placed in the magnetic field H to be measured in such a manner that the plane of the loop 6 is perpendicular to the field component H $\cos \delta$ the value of which is to be determined. The generator 10 may include, in addition to a voltage generator proper, suitable means intended in conjunction with components in the indicator 11 to prevent the transfer of energy from the generator to the indicator except when the probe is placed in a magnetic field. Further the indicator may include amplifying and other equipment in addition to voltage or current measuring apparatus.

For given dimensions of the piezo-electric crystal the frequency of the generator is so chosen that a resonance is obtained between the crystal 1 and the generator 10 for a mode of excitation of the crystal in which the faces of the crystal bearing the loop 6 are displaced in such directions that the area of the loop is periodically altered by vibrations of the crystal.

In order to obtain a maximum sensitivity for the apparatus, it is advantageous to select such a manner of excitation that the oscillations of the loop surface are as great as possible.

The operation of the magnetometer is as follows:

The piezo-electric crystal excited by the generator 10 distorts the loop 6, integral with its surface, in such a manner that the flux of the field to be measured which is linked by the loop varies periodically at the frequency of vibration of the crystal. The periodically varying voltage induced at the terminals 7 and 8 of the loop by variation of the magnetic flux is transmitted to the indicating device 11. For a given voltage of excitation of the crystal this device can be directly calibrated in values of the magnetic field.

Inasmuch as for a given mode of excitation of the crystal the amplitude of its vibrations is exactly proportional to the value of the excitation voltage, over a very wide range extending practically to the limit of destruction of the crystal, it is very easy to change the sensitivity of the apparatus and to modify the value of its calibration by a simple alteration of the excitation voltage produced by the generator 100.

In order to obtain a very high sensitivity of the apparatus, certain precautions must be, however, taken. The maximum sensitivity of the apparatus depends on two factors:

1. The sensitivity of the indicating apparatus 11;
2. The completeness of de-coupling of the excitation circuit 100, 4', 4, 2, 1, 3, 5, 5' from the indicating circuit 110, 7', 7, 6, 8, 8', 110. Such decoupling is necessary in view of the electrostatic coupling between the excitation and indicating circuits caused by the capacity existing between the electrodes 2 and 3 and the loop 6.

As regards the maximum sensitivity of the indicating apparatus, values between $10^{-1}$ and $10^{-6}$ volts can be readily had over the usual frequencies of excitation which may, according to the crystals used, lie between $10^5$ and $10^7$ c./s.

Calculation for a particular pattern of exploration crystal will give an indication of the approximate voltage to be had at the output of the probe and will give an idea as to the decoupling required to obtain the desired sensitivity. That is, given the voltage which will be induced at the loop terminals through the mechanism of a magnetic field of the strength to be measured, an estimate may be made of the degree of decoupling between generator and indicator circuits which is required to keep the electrostatic transfer of energy between the excitation terminals and the loop terminals of the probe at a level sufficiently low so as not to mask the magnetically induced signal.

Thus an $X_3$-cut quartz crystal having the shape of a square section prismatic plate of 1 square centimeter area and having its natural frequency of $3.10^5$ c./s. excited by a voltage of 1 R. M. S. volt in shearing vibrations supplies, in a field of 1 gauss, a voltage of approximately 10 microvolts. The internal impedance of this source being very small, a step-up transformer can be inserted between the probe and the indicating device, and it is obvious that the sensitivity of the whole apparatus is not essentially limited by the sensitivity of the recording indicator, even if fields down to $10^{-2}$ gauss are to be measured. The sensitivity of the whole apparatus will be practically determined by the coupling of the two circuits.

Figure 5:
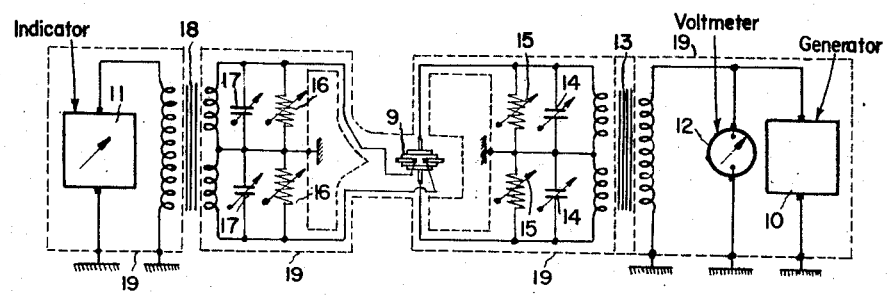
Fig. 5 is a schematic diagram of a magnetometer according to the invention.

Fig. 5 represents the complete circuit of a magnetometer according to the invention in which regard is had for these considerations. 9 denotes the probe, 10 the generator proper, and 11 the indicator proper. For decoupling, a symmetry balancing circuit is provided on the excitation side comprising a transformer 13 with a grounded center-tapped secondary winding, adjustment capacities 14 and adjustment resistances 15. 12 is an excitation voltage indicator. The symmetry balancing circuit on the field indicator side comprises a transformer 18 with a grounded center-tapped primary winding, adjustment capacities 17 and adjustment resistances 16. The complete apparatus is protected by an electrical shield 19.

As an additional precaution against false readings due to electrostatic transfer at the probe or to radiation from the generator, the generator 10 is advantageously tuned to produce a voltage the frequency of which is a sub-harmonic of the resonance frequency of the crystal in the probe 9, and the secondary winding of transformer 13 is tuned, by means of condensers 14, to this subharmonic frequency. On the other hand, the primary winding of transformer 18 is tuned, by means of condensers 17, to the resonance frequency of crystal 1.

If all these precautions are taken, the use of a quartz crystal according to the example described above will make possible a sensitivity of the apparatus sufficient to measure field components down to $10^{-1}$ gauss. By using piezoelectric crystals of a higher modulus, such as Seignette salt for instance, the sensitivity can be even further improved.

The problem of de-coupling being less delicate for measurement of fields of high intensity, a portion of the loop can be fitted to one or to both surfaces bearing the electrodes, or the loop can even be connected to one of these electrodes.

Figure 1:
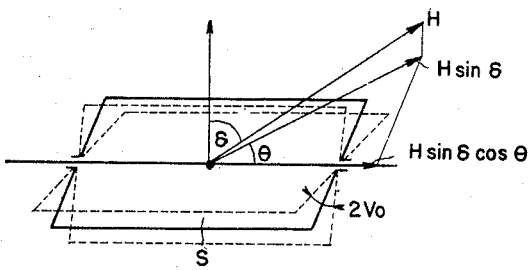
Fig. 1 is a diagram illustrating the principles involved in the prior art piezo-electric magnetometers discussed above.

An example of this latter arrangement is shown in Figs. 6 and 7. In these figures, the reference numerals have the same significance as in Figs. 1 and 2. In Fig. 6 electrodes 2 and 3 are applied to opposite faces of the crystal. The flat plate electrode 2 includes band-like extensions 6 applied to two additional faces of the crystal, and these band-like portions terminate at terminals 7 and 8. The loop thus encompasses three sides of the crystal.

The field, or the component of the field to be measured, is perpendicular to the plane of the drawing. The excitation is carried out between terminal 5 and terminals 7 and 8 in parallel. Thus, since the A. C. excitation current has, for one half cycle, the direction of arrows 20 and 21, no voltage appears in secondary winding 24 of transformer 22.

On the other hand, the current to be measured flows through circuit 7, 6, 2, 6, 8, and primary winding 23 of the transformer 22, and has, for one half cycle, the direction of the arrows 25 and 26. In consequence a voltage is induced at the terminals of the secondary winding 24.

In order to avoid excessive damping of the crystal, all the connections 4, 5, 7 and 8 are affixed to the crystal at points where no mechanical vibrations occur, or at least where these vibrations have a very small amplitude. For this reason it is advisable to use crystal excitation modes having nodal lines, or at least having more than one pair of nodal points on the quartz surface.

It is obvious that instead of a simple loop 6 it is possible to use, in a manner quite similar to that illustrated in Figs. 2 and 3, a coil of several turns on the lateral surface of the crystal.

Figure 8:
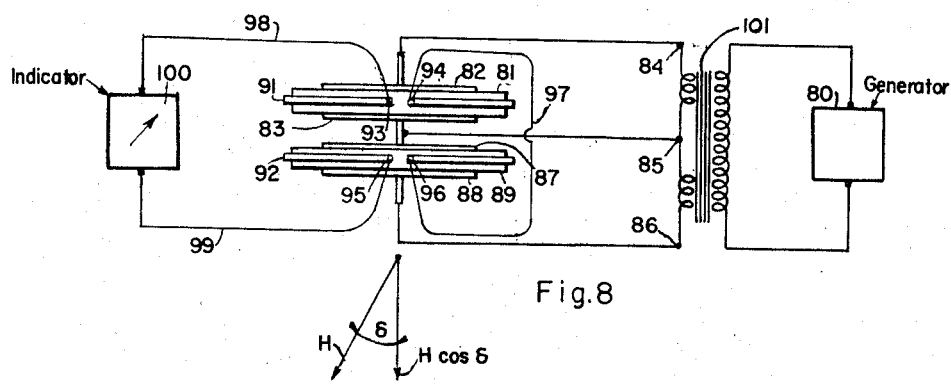
Fig. 8 is a schematic representation of a further modified form of magnetometer according to the invention in which the exploration probe includes two crystals and associated loops.

Fig. 8 represents an embodiment wherein the symmetry balancing of the network is obtained by use of two identical but inverted crystals mounted one above the other in such a manner as to be traversed by the same flux, namely by the component H cos δ of the field H to be measured. The generator 80 feeds the primary winding of the transformer 101. The electrodes 82 and 83 of the crystal 81 are connected between the end 84 and the midpoint 85 of the secondary winding of the transformer 101. The electrodes 87 and 88 of the crystal 89 are connected between the end 86 and the midpoint 85 of the secondary winding of the transformer 101. Accordingly the crystals 81 and 89 vibrate with a relative phase of an integral number of half periods of the excitation voltage applied to the transformer. Under these conditions when the surface of the loop 91 of the crystal 81 increases, the surface of the loop 92 of the crystal 89 decreases, and vice versa. In either case the vibrations effect motion of the conducting loops 91 and 92 transversely of their lengths.

If the terminal 94 of the loop 91 is connected to the terminal 96 of the loop 92 through lead 97, and if the terminals 93 of 91 and 95 of 92 are respectively connected to the indicator 100 through leads 98 and 99, the voltages induced by the magnetic field are added in the two loops. On the other hand, the residual voltages induced in each loop by the current exciting the crystal which bears the loop are mutually annulled thanks to the serial arrangement of the two loops.

It is obvious that the apparatus can also be used for measurement of periodically varying magnetic fields, unless the frequency of these variations be small with respect to the resonance frequency of the piezo-electric crystal. In this case, it is possible to record by means of the indicator 11 either the amplitude of the alternating magnetic field, or the variations of this latter by using some well-known means such as, for instance, a cathode-ray oscillograph.

While I have described a number of preferred embodiments of my invention, it will be understood that my invention is not restricted to the details of construction shown. Variations and modifications may be made within the scope of my invention as set forth in the appended claims.

I claim:

1. A piezo-electric magnetometer comprising an A. C. generator, two piezo-electric crystals supported with their principal sections parallel and with their electric axes substantially opposite to each other, two excitation electrodes arranged on each of the crystals, a coil of one or more turns affixed to each of the crystals in a plane parallel to the principal sections of the crystals, means to apply an A. C. voltage to the excitation electrodes of the two crystals in series, and an indicator connected to the two coils in series, the connections of the coils and indicator being such that the voltage induced in the coils when the crystals are excited aid each other.

2. A piezo-electric magnetometer comprising a generator of A. C. voltage, two piezo-electric crystals capable of vibrating at the same resonant frequency, means to support the crystals in fixed relative positions with their electric axes substantially parallel and oppositely directed, two excitation electrodes arranged on each of the crystals, a conductor affixed to each of the crystals substantially in a plane parallel to the principal sections of the crystals, means to apply voltage from said generator to said excitation electrodes, voltage indicating means, means to connect the conductors in a series circuit with such relative connection of the conductors that the voltages magnetically induced in the conductors upon excitation of the crystals in a magnetic field are additive, and means to couple said series circuit to said voltage indicating means.

3. A piezo-electric magnetometer comprising two piezo-electric crystals capable of vibrating at the same resonant frequency, means to support the said crystals in fixed relative positions with their electric axes substantially parallel and oppositely directed, two excitation electrodes arranged on each of said crystals, a source of A. C. voltage of frequency simply related to said resonant frequency, means coupling said source to said excitation electrodes, a conductor mechanically coupled to each of said crystals whereby said conductors may be vibrated by the crystals to which they are respectively coupled in directions transverse to their length, said conductors lying in substantially parallel planes, means connecting said conductors in a series circuit with such relative orientation of said conductors that upon excitation of said crystals in a magnetic field the voltages induced in said conductors by their motion in said field are additive at the terminals of said series circuit, and means to measure the voltage in said series circuit.

4. A piezo-electric magnetometer comprising two piezo-electric crystals capable of vibrating at the same resonant frequency, means to support said crystals in fixed relative positions with their electric axes substantially parallel and opposite to each other, a conductor mechanically coupled to each of said crystals whereby said conductors may be vibrated by the crystals to which they are respectively coupled in directions transverse to their length, said conductors lying in substantially parallel planes, means to excite said crystals into vibrations at said resonant frequency in phase relation differing by an integral number of half periods of said resonant frequency, and a connection between one terminal of one of said conductors and one terminal of the other of said conductors, said terminals being so selected that the voltages magnetically induced in said conductors by their vibration in a magnetic field are additive.

5. A piezo-electric magnetometer comprising a generator of alternating current voltage, two piezo-electric crystals capable of vibrating at the same resonant frequency supported in fixed relative position with their electric axes substantially opposite to each other, two excitation electrodes arranged on each of said crystals, means to couple said generator to said crystals, a conductor mechanically coupled to each of said crystals whereby said conductors may be vibrated by the crystals to which they are respectively coupled in directions transverse to their length, a voltage indicating means, and means to connect said conductors and voltage indicating means in series, the connection between said conductors being such as to make additive the voltages magnetically induced in said conductors upon excitation of said crystals when immersed in a magnetic field.

RICHARD A. WALLAUSCHEK.

References Cited in the file of this patent

UNITED STATES PATENTS

| Number | Name | Date |
|---|---|---|
| 2,363,781 | Ferguson | Nov. 28, 1944 |
| 2,485,931 | Sloczewski | Oct. 25, 1949 |
| 2,517,975 | Chapin | Aug. 8, 1950 |